United States Patent [19]

Watanabe et al.

[11] 4,447,959
[45] May 15, 1984

[54] INSTRUMENT FOR MEASURING INTERNAL DIMENSIONS

[75] Inventors: Teruo Watanabe; Masaaki Ishikawa, both of Kawasaki, Japan

[73] Assignee: Mitutoyo Mfg. Co., Ltd., Tokyo, Japan

[21] Appl. No.: 385,358

[22] Filed: Jun. 7, 1982

[30] Foreign Application Priority Data

Jun. 19, 1981 [JP] Japan ................................. 56-95604

[51] Int. Cl.³ ........................... G01B 5/12; G01B 7/12
[52] U.S. Cl. ........................ 33/178 E; 33/147 K; 33/147 N
[58] Field of Search ............ 33/143 L, 147 K, 147 N, 33/178 R, 178 E

[56] References Cited

U.S. PATENT DOCUMENTS

| | | | |
|---|---|---|---|
| 1,048,073 | 12/1912 | Hirth | 33/147 K |
| 3,909,950 | 10/1975 | Possati | 33/178 E |
| 4,344,233 | 8/1982 | Albertazzi | 33/178 E |
| 4,355,467 | 10/1982 | Albertazzi | 33/178 E |
| 4,386,467 | 6/1983 | Possati et al. | 33/143 L |

FOREIGN PATENT DOCUMENTS

| | | | |
|---|---|---|---|
| 802103 | 2/1951 | Fed. Rep. of Germany | 33/178 R |
| 664927 | 8/1964 | Italy | 33/147 K |
| 553791 | 6/1943 | United Kingdom | 33/178 E |
| 736570 | 9/1955 | United Kingdom | 33/147 N |

*Primary Examiner*—Richard R. Stearns
*Attorney, Agent, or Firm*—Flynn, Thiel, Boutell & Tanis

[57] ABSTRACT

An instrument is disclosed for measuring internal dimensions by effecting an absolute measurement of an internal dimension of a workpiece using two measuring elements.

This instrument for measuring internal dimensions has probes of the measuring elements disposed at two points on a plane incorporating the center axis of a positioning member, the forward end portion of which has a tapered surface, and the probes are adapted to abut against the inner wall surface of the workpiece which is guided by the tapered surface of the positioning member, whereby a distance between the two probes in the aforesaid abutting state is detected by a displacement detecting device, thereby measuring the internal dimension of the workpiece.

12 Claims, 2 Drawing Figures

INSTRUMENT FOR MEASURING INTERNAL DIMENSIONS

BACKGROUND OF THE INVENTION

1. Field of the Invention

This invention relates to instruments for measuring internal dimensions, and particularly to an instrument for measuring internal dimensions wherein an interval between two measuring elements is detected by a displacement detecting device to thereby measure an internal dimension of a workpiece to be measured.

2. Description of the Prior Art

A conventional instrument for measuring internal dimensions, e.g., an instrument for measuring internal dimensions described in Japanese Patent Application No. 54421/79, is of such an arrangement that a detecting head having a pair of probes is provided. These probes are abutted against a reference ring gauge having predetermined dimensions which rests on and is affixed to a measuring table, and an inner wall at one side of a workpiece to be measured, respectively. At the same time, subsequently, the measuring table is moved to abut the probes against the ring gauge and an inner wall at the other side of the workpiece to be measured, and an internal dimension of the workpiece is obtained based on a difference in inclination between the probes through a relative measurement therebetween as determined from the ring gauge.

As described above, according to method of measurement, a relative measurement is effected, i.e., the internal dimension of the workpiece is measured as a difference from the inner dimensions of the ring gauge having predetermined dimensions which rests on one and the same measuring table. For structural reasons relating to the instrument for measuring an internal dimension, a predetermined positional relationship is required between the workpiece and the ring gauge in their mounting, thus presenting such disadvantages as that the measuring operation is complicated and takes a long period of time because considerable labor is needed for constructing the mounting of the workpiece and the ring gauge.

To obviate the above-described disadvantages, there has been proposed the instrument for measuring internal dimensions of Japanese Utility Model Application No. 146754/79, according to which a method is further proposed as being capable of effecting an absolute measurement of an internal dimension of a workpiece without using a ring gauge. According to this method two probes are provided on a detecting head, and parallel springs are interposed between members for holding these probes and transferring means, whereby a displacement value between the respective holding members holding the two probes is detected.

Although the above-described instrument for measuring internal dimensions is simplified as compared with one in which the workpiece to be measured must be disposed at a predetermined interval with respect to a ring gauge, it requires various parts to achieve certain functions, including the function of moving probes longitudinally and laterally to obtain the true diameter when an internal dimension of the workpiece is measured the function of storing measured values at respective points, and a maximum value detecting function for indicating the maximum value as the diameter. Therefore, the need has been voiced for improvements in eliminating such troublesomeness in the measuring operation and in reducing the number of associated essential functions of the instrument for measuring internal dimensions, thus lowering the cost of production.

SUMMARY OF THE INVENTION

The present invention has as its object the provision of an instrument for measuring internal dimensions capable of facilitating the disposition of the workpiece to be measured, eliminating the need for the work of proving the true diameter, and effecting an absolute measurement of the internal dimension.

To achieve the above-described object, the present invention contemplates that the forward end portion of a positioning member which is movably provided is formed into a tapered shape. Two probes of two measuring elements project from the outer peripheral surface of the aforesaid tapered shape at diametrically opposite positions, and when the wprkpiece to be measured is disposed on a mount with the surface of the inner wall of the workpiece abutted against the tapered surface of the positioning member, the probes are automatically brought into abutting contact with the true diameter portion of the workpiece, whereby a distance between the two probes is established, so that the inner dimensions of the workpiece can be obtained.

DETAILED DESCRIPTION OF THE PREFERRED EMBODIMENT

Figure 1:
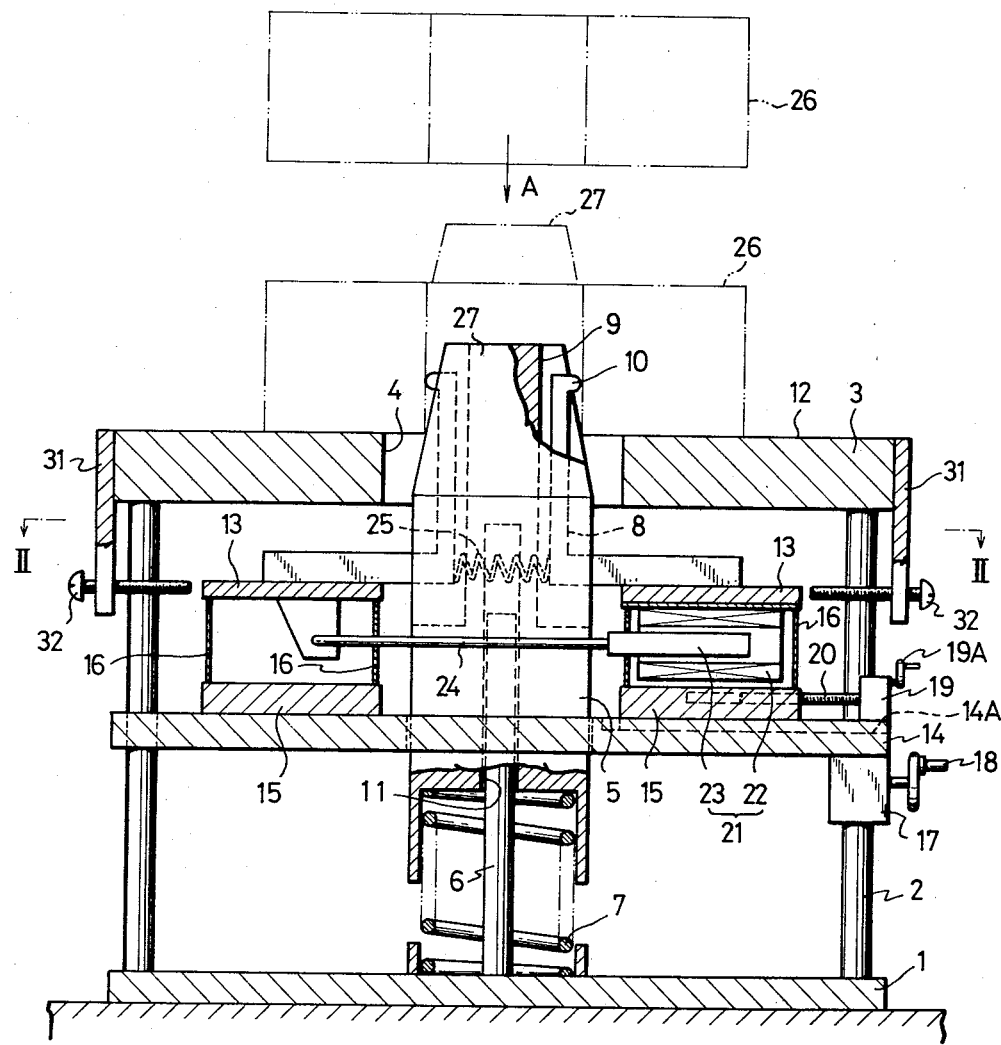
FIG. 1 is a sectional front view showing an embodiment of the instrument for measuring internal dimensions according to the invention, in which the upper portion and the lower portion are different as to the positions of the sections shown.

Description will hereunder be given of one embodiment of the present invention with reference to the drawings.

A mount 3 is fixedly provided in the vicinity of the upper ends of four supports 2 erected at four corners of a base 1. A cylindrical opening 4 is provided about the central portion of this mount 3, and a positioning member 5 having substantially a columnar form is movably provided in the opening 4 in opposed relation to the wall defining the opening 4. A head 27 at the forward end portion of this positioning member 5 has a tapered shape. The positioning member 5 as a whole is guided by a guide bar 6 erected on the base 1 through a guide recess 11, is biased by a spring 7 confined between the lower end of the positioning member 5 and the base 1, and is vertically movable in a direction perpendicular to a workpiece mounting surface 12 of the mount 3.

Two opposing L-shaped measuring elements 8 are received in receiving grooves 9 extending in the axial direction of the positioning member 5 on the outer peripheral surface thereof so as to be movable in the axial direction and in a direction perpendicularly intersecting the axial direction in the vicinity of the outer periphery of the positioning member 5. Probes 10 adapted to be brought into abutting contact with the inner wall surface of the workpiece 26 are integrally formed at the forward end portions of these measuring elements 8, and these probes 10 are disposed in the vicinity of the tapered surface at the forward end of the positioning member 5. A straight line connecting the forward ends of the two opposing probes 10 passes through the central axis of the tapered head 27 of the positioning member 5.

The horizontal side portions of the two opposing measuring elements 8 are affixed onto holding members 13, respectively, and these holding members 13 are supported by spring securing members 15 provided on a platform 14 through pairs of parallel sheet springs 16, respectively, so as to be movable in the horizontal direction. The platform 14 is vertically movably supported by the four supports 2, and is vertically movable by means of pinion in a gear box 17 provided in the vicinity of a portion of the platform 14, which pinion is engagable with one of the supports 2 and a rack formed on the support 2. The rack and pinion are not shown. The pinion is driven by the rotation of a handle wheel 18 provided on the gear box 17. With the above-described arrangement, the platform 14 can be vertically moved, so that the heights of the probes 10 from the workpiece mounting surface 12 on the mount 3 can be adjusted.

At least one of the spring securing members 15 provided on the platform 14, e.g., the spring securing member 15 shown on the right in FIG. 1, is adapted to be slidably guided by a guide portion 14A such as a dovetail groove mechanism formed on the upper surface of the platform 14 and the undersurface of the spring securing member 15, so that both spring securing members 15 can approach or recede from each other. Movement of the spring securing member 15 is effected by the rotation of an adjusting membe 20 screwed at one end portion thereof into one side portion of the spring securing member 15 and rotatably supported at the other end portion thereof by a bearing member 19 provided on the platform 14. More specifically, a handle wheel 19A provided on the bearing member 19 is rotated, whereby the adjusting member 20 consisting of a screw shaft is rotated through a gear interlocking mechanism, not shown, so that the adjusting member 20 and the spring securing member 15 can be displaced while in a threadedly coupled position.

A coil 22 of the differential transformer 21 acting a displacement detecting device is suspended from the undersurface of one of the holding members 13 having the two measuring elements 8 resting thereon, e.g., the holding member 13 shown on the right in FIG. 1. A core 23 slidably provided in the coil 22 is affixed to the other of the holding members 13, i.e., the holding member 13 shown on the left in FIG. 1. Additionally, confined between the two holding members 13 are compression coil springs 25, by which the measuring elements 8 are biased to project from the receiving grooves 9 of the positioning member 5. Movements of the elements 8 in the directions of projection, i.e., the directions for mutual separation, are regulated by the abutment of the outer ends of both holding members 13 against the respective forward ends of stop position adjusting members 32 consisting of screws linearly movably screwed into the lower portions of brackets 31, which are suspended from opposite right and left end surfaces of the mount 3. The stop position adjusting members 32 are adjusted by being screwed-in, so that the projection values of the measuring elements 8 can be adjusted through the holding members 13.

Furthermore, the measuring elements 8 can be transferred to the central portion of the positioning member 5 or returned to their original positions through the agency of the compression coil springs 25 and the parallel sheet springs 16. Due to the movements of the measuring elements 8, the probes 10 can appear from or disappear into the tapered surface of the positioning member 5. These movements of the probes 10 make it possible for the probes 10 to move inwardly into the tapered surface of the positioning member 5 and thereby be protected when corner portions of the inner wall surface of the workpiece 26 abut against the probes 10 during mounting of the workpiece 26 onto the mount 3.

Figure 2:
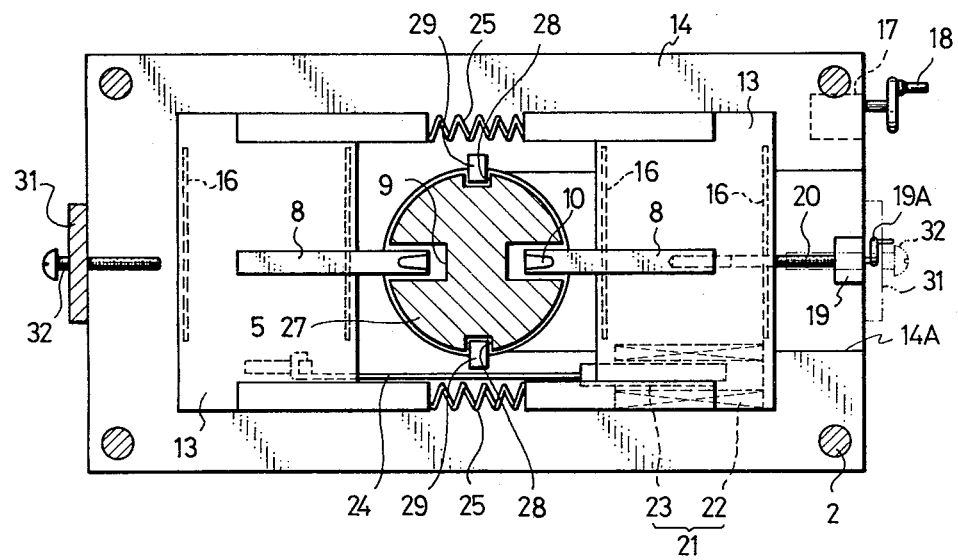
FIG. 2 is a sectional view taken along the line II—II in FIG. 1.

Further, as shown in FIG. 2, provided on the outer peripheral surface of the positioning member 5, in addition to the receiving grooves 9 for receiving the probes 10, are guide grooves 28 for preventing the positioning member 5 from rotating and moving in the vertical direction. These guide grooves 28 extend in diametral directions perpendicularly intersecting the receiving grooves 9, and guide members 29 set into these guide grooves 28 are formed on the platform 14.

Description will hereunder be given of the action of the present embodiment in accordance with the procedural steps of measurement.

Firstly, the head 27 and the positioning member 5 are selected which have dimensions on tapering corresponding to the internal dimensions of the workpiece 26 to be measured. As indicated by two-dot chain lines in FIG. 1, the head 27 of the positioning member 5 is greatly projected above the mount 3 before the workpiece 26 is mounted on the mount 3.

If the workpiece 26 is lowered against the resiliency of the spring 7 and is thereby abutted against the workpiece mounting surface 12 on the mount 3, while the inner wall surface portion of the workpice 26 abuts against the tapered surface of the head 27 thus projected, then the center of the positioning member 5 and the center of the internal dimension of the workpiece 26 should necessarily be aligned with each other.

In abutting the workpiece 26 against the tapered surface of the head 27, the corner portion of the inner wall surface of the workpiece 26 may sometimes abut against the probes 10 projected from the tapered surface. In such cases, the probes 10 are received into the receiving grooves 9 owing to deformations of the springs 25, so that the probes 10 avoid being damaged. At this time, if the degree of projection of the probes 10 is excessively large with respect to the internal dimension of the workpiece 26, then movements of the probes 10 into the receiving grooves 9 cannot be smoothly effected. In order to remedy this, the stop position adjusting members 32 are adjusted, whereby the outer ends of both probes 10 project slightly outwardly from the internal dimension of the workpiece 26. Additionally, the compression coil springs 25 function to urge the probes 10 against the inner wall surface of the workpiece 26 under a predetermined amount of biasing force when the workpiece 26 is correctly mounted on the mount 3.

When the handle wheel 18 is rotated to vertically move the platform 14, to which are secured together the measuring elements 8, the holding members 13 for holding the measuring elements 8, the differential transformer 21 which acts as a displacement detecting device and the like, under the guidance of the supports 2, the probes 10 can be vertically moved with respect to the mounting surface 12 of the mount 3, so that the probes 10 can be accommodated to the thickness of the workpiece 26 and to the height of the internal dimension to be measured.

According to the present invention, when the workpiece 26 is mounted on the mount 3 and the two opposing probes 10 are brought into abutting contact with the inner wall surface of the workpiece 26, the center of the tapered surface comes into alignment with the line connecting the two probes 10 to each other, whereby the probes 10 come into abutting contact with the true internal dimension measuring points i.e., the points of the maximum internal dimension, at the very outset. When a distance between the two probes 10 is read by the differential transformer 21, which acts as the displacement detecting device through its connection with the measuring elements 8 and the holding members 13, the internal dimension of the workpiece 26 can be directly read. With the differential transformer 21 used in the present embodiment as the displacement detecting device, there are some cases where it is better to slide the spring securing members 15 to zero-adjust the differential transformer 21, i.e., to zero an output from the differential transformer 21 before the workpiece 26 is mounted on the mount 3. However, this depends on how an output from the differential transformer 21 is to be processed in the succeeding circuit. Consequently, the differential transformer need not necessarily be limited to use by zero-adjustment first and then reading of the measured result as an absolute value. The internal dimension may be calculated through a comparison between the original reference numerical value, e.g., the internal dimension during design, and the measured result.

Upon completion of the internal dimension measurement of one workpiece 26 as described above, this workpiece 26 is replaced by another workpiece 26, thus successively repeating measurements by the same procedural steps as aforesaid. In this case, if the internal dimension of the workpiece 26 differs from the one measured the preceding time to a considerable extent, the handle wheel 19A is operated to slide the spring securing member 15 in the right to thereby perform adjustment in dimension between the measuring elements 8, i.e., the two probes 10, whereby the distance between the outer ends of the two probes 10 is set to be slightly larger than the internal dimension of the workpiece 26 to be measured, thus performing the measurement in the same manner as described above.

In addition, the holding members 13, on which are mounted the measuring elements 8, respectively, are supported by the parallel sheet springs 16. This arrangement is made in consideration that, when the probes 10 approach or recede from each other, the coil 22 and the core 23 in the differential transformer 21, the displacement detecting device, can slide on an axis parallel to each other at all times.

In the present embodiment, the positioning member 5 formed with the head 27 having a tapered shape is erectly provided so as to be vertically movable in a direction perpendicularly intersecting the plane on which the mount 3 is disposed, and hence it suffices to mount the workpiece 26 on the mount 3 in such manner that the inner wall surface of the workpiece 26 meets the tapered surface, thus eliminating the need for the work of probing the diameter. In such work the maximum value is measured as the true internal dimension while the probes are moved on the inner wall surface, as has been required in the conventional procedure. As the result, the present embodiment is advantageous in that repeated measuring of products of the same type can be carried out highly accurately and quickly.

From the same reason as described above, it becomes possible to automatically supply and measure the workpiece 26. Further, it is possible to measure the internal dimensions even of a workpiece in which the end face has a hole, and a workpiece in which different internal dimensions are formed in one hole, by the guidance of the tapered surface. Even if the outer shape is unusual, the need for special mounting work is eliminated and the mounting work can be completed in a short period of time because the positioning of the workpiece 26 is effected by a method of reference from a hole.

In the present embodiment, referring to the drawings, the head 27 having a tapered shape is integrally formed at the forward end of the positioning member 5. However, the head 27 may be made removable from the positioning member 5 for replacement. In this case, accommodation to large and small internal dimensions of the workpiece is facilitated, so that a wide range of the internal dimensions from large to small ones can be measured.

In the present embodiment, as a guide for the positioning member 5 in the vertical direction, there is adopted a construction in which a round bar is erected at the central portion. However, so far as the relation between the guide member and the positioning member 5 is concerned, there may be adopted another construction wherein the guide member is slided by use of a so-called outer casing disposed outwardly of the positioning member 5.

Further, the platform 14, on which the probes 10, the measuring elements 8, the displacement detecting device 21 and the like are mounted, is made vertically movable. However, this construction of the platform 14 may be replaced by one in which the mount 3 is vertically movable, or another in which both the platform 14 and the mount 3 are vertically movable separately of each other, so long as the probes 10 can be vertically movable relative to the mount 3.

Additionally, in the present embodiment, the differential transformer 21 of the electric detection type adopted as the displacement detecting device, is, however, replaceable by one of various scales of a magnetic type and an optical type which obtain the same advantages as in the present embodiment.

Further, the spring securing members 15 are not limited an arrangement wherein only one thereof is slidable, and both may be made slidable. In this case, both spring securing members 15 may be made movable separately of each other, or may be made movable in unison by one driving source. Alternately both securing members 15 may be fixedly provided without being movable at all.

According to the present invention, the instrument for measuring internal dimensions is of such an arrangement as described above, and hence the present invention can offer the outstanding advantages of providing an instrument for measuring internal dimensions which is capable of improved workability in mounting the workpiece, the measuring operation and the like, and of effecting an absolute measurement of the internal dimension.

What is claimed is:

1. An instrument for measuring an internal dimension of a workpiece, comprising:
    a mount having a planar upper surface adapted to support a workpiece thereon, said mount having an upright opening which extends therethrough and penetrates said planar upper surface;

an elongated, vertically movable, workpiece positioning member extending upwardly through said opening in said mount, said positioning member having a longitudinal axis which is perpendicular to said planar upper surface, said positioning member having an upwardly tapering upper end portion, and means supporting said workpiece positioning member for vertical movement relative to said mount;

a pair of upright measuring elements disposed on opposite sides of said workpiece positioning member and means supporting said measuring elements for horizontal movement toward and away from each other, said measuring elements extending upwardly through said opening and having a pair of measuring probes on the upper ends of said measuring elements respectively, said probes being positioned to extend outwardly in opposite directions from said tapered upper end of said positioning member when said workpiece is in contact with said planar upper surface and an internal dimension measurement of said workpiece is effected, such that said probes contact with said workpiece, whereby the distance between said probes indicates said internal dimension of said workpiece; and a displacement detecting device for detecting the distance between said measuring probes.

2. An instrument as claimed in claim 1, wherein said workpiece positioning member has a pair of diametrically opposed, elongated, upright grooves in the outer periphery thereof, said grooves being elongated in the vertical direction of said workpiece positioning member and said grooves opening radially outwardly in opposite radial directions, said measuring elements being respectively disposed in said grooves, and said probes extend radially outwardly from said grooves when said probes come into contact with said workpiece.

3. An instrument as claimed in claim 2, in which said grooves have a radial depth sufficient to permit said probes to be totally received in said grooves.

4. An instrument as claimed in claim 1 or claim 2, wherein said upper end portion of said workpiece positioning member is detachable from the remainder of said positioning member.

5. An instrument as claimed in claim 1 or claim 2, wherein said displacement detecting device is a differential transformer.

6. An instrument as claimed in claim 1 or claim 2, further comprising means supporting said measuring elements for movement in a direction perpendicular to the longitudinal axis of said positioning member.

7. An instrument as claimed in claim 1 or claim 2, further comprising means supporting said mount for movement in a vertical direction.

8. An instrument for measuring an internal dimension of a workpiece, comprising:

a base;

a mount supported on said base and having a planar upper surface adapted to support said workpiece thereon, said mount having an upright opening which extends therethrough and penetrates said planar upper surface;

an elongated, vertically movable workpiece positioning member extending upwardly through said opening in said mount beyond said planar upper surface thereof, said positioning member having a longitudinal axis which is perpendicular to said planar upper surface, said positioning member having an upwardly tapering upper end portion and having means supporting said workpiece positioning member for vertical movement thereof relative to said mount;

first spring means for resiliently biasing said workpiece positioning member toward an upper position whereat said positioning member extends upwardly above said planar upper surface of said mount opening;

a pair of upright measuring elements disposed on opposite sides of said workpiece positioning member and means supporting said measuring elements for horizontal movement toward and away from each other, said measuring elements extending upwardly through said opening and having a pair of measuring probes on the upper ends of said measuring elements respectively, said probes being positioned to extend radially outwardly in diametrically opposite directins from said tapered upper end portion of said positioning member when said workpiece is in contact with said planar upper surface and an internal dimension measurement of said workpiece is effected, such that said probes come into contact with said workpiece, whereby the distance between said probes indicates said internal dimension of said workpiece;

a platform mounted to said base for vertical movement with respect thereto;

a pair of holding members disposed on opposite sides of said positioning member, the lower ends of said measuring elements being mounted on said holding members;

two pairs of sheet springs, each pair being connected to an associated one of said holding members;

a pair of spring securing members, each of which is connected to one of said pairs of sheet springs, and holding members being flexibly, resiliently connected to said spring securing members by the associated sheet springs, said spring securing members being mounted on said platform; and a displacement detecting device for detecting the distance between said measuring probes.

9. An instrument as claimed in claim 8, further comprising second spring means confined between said holding members, said second spring means resiliently urging said holding members in opposite directions, whereby said measuring elements and said probes are biased toward their respective radially outermost positions.

10. An instrument as claimed in claim 8, wherein at least one of said spring securing members is mounted on said movable platform for horizontal movement along said platform towards and away from the other of said spring securing members.

11. An instrument as claimed in claim 10, further comprising a feed screw threadedly coupled with said one spring securing member, and a handle connected to said feed screw for rotating said feed screw and thereby effecting movement of said one spring securing member.

12. An instrument for measuring an internal dimension of a workpiece, comprising:

a base;

support means mounted on said base;

a mount secured to said base by said support means, said mount having an opening therethrough and having a planar workpiece mounting surface which surrounds said opening at the upper end of said opening farthest from said base;

an essentially cylindrical workpiece positioning member which is movably positioned to extend upwardly through said opening in said mount beyond said workpiece mounting surface thereof, said positioning member having a lengthwise axis which is perpendicular to said planar workpiece mounting surface, said positioning member having a frusto-conical forward end portion thereof which has an outer peripheral surface which tapers upwardly, said positioning member including means for allowing only vertical movement thereof relative to said mount;

spring means for resiliently biasing said positioning member toward a position whereat said positioning member extends upwardly through said opening in said mount;

a movable platform which is movably secured to said support means between said base and said mount for movement in a vertical direction;

a pair of spring securing members mounted on said movable platform, at least one of said spring securing members being adapted for horizontal movement along said platform;

two pairs of vertically-extending sheet springs, each of said pairs of sheet springs being connected to an associated one of said spring securing members;

a pair of holding members disposed on opposite sides of said positioning member, which holding members are connected to said spring securing members by an associated pair of said sheet springs;

a pair of measuring elements disposed on diametrically opposite sides of said positioning member, each of said measuring elements being connected to a respective one of said holding members, the upper ends of said measuring elements having a pair of measuring probes formed thereon said probes being positioned to extend radially outwardly in diametrically opposite directions from the tapered peripheral surface of said forward end portion of said positioning member when an internal dimension measurement of a workpiece in abutment with said workpiece mounting surface is effected, such that said probes come into contact with said workpiece, whereby the distance between said probes indicates an internal dimension of said workpiece; and a displacement detecting device capable of detecting the distance between the associated probes of said measuring elements.

* * * * *